United States Patent
Rüegg et al.

(10) Patent No.: US 12,392,742 B2
(45) Date of Patent: Aug. 19, 2025

(54) THERMAL SENSOR DEVICE AND METHOD FOR DETERMINING A CONCENTRATION OF A TARGET GAS IN A GAS SAMPLE

(71) Applicant: Sensirion AG, Stäfa (CH)

(72) Inventors: Andreas Rüegg, Männedorf (CH); David Kiliani, Hombrechtikon (CH); Matthias Studer, Männedorf (CH); Nicolas Moeller, Stäfa (CH); Mark Hornung, Stäfa (CH); Lukas Bürgi, Zurich (CH)

(73) Assignee: Sensirion AG, Stäfa (CH)

( * ) Notice: Subject to any disclaimer, the term of this patent is extended or adjusted under 35 U.S.C. 154(b) by 182 days.

(21) Appl. No.: 18/082,467

(22) Filed: Dec. 15, 2022

(65) Prior Publication Data
US 2023/0194450 A1    Jun. 22, 2023

(30) Foreign Application Priority Data
Dec. 17, 2021 (EP) ..................................... 21215403

(51) Int. Cl.
*G01N 25/18* (2006.01)
(52) U.S. Cl.
CPC ..................................... *G01N 25/18* (2013.01)
(58) Field of Classification Search
None
See application file for complete search history.

(56) References Cited

U.S. PATENT DOCUMENTS

| 6,079,253 A | 6/2000 | Bonne et al. |
| 7,188,519 B2 | 3/2007 | Hornung et al. |

(Continued)

FOREIGN PATENT DOCUMENTS

| EP | 2 629 084 A1 | 8/2013 |
| EP | 2 793 018 A1 | 10/2014 |

(Continued)

OTHER PUBLICATIONS

European Search Report in European Application No. 21215403.3 dated May 12, 2022.

*Primary Examiner* — Peter J Macchiarolo
*Assistant Examiner* — Jermaine L Jenkins
(74) *Attorney, Agent, or Firm* — Foley & Lardner LLP

(57) ABSTRACT

A thermal sensor device serves for determining a concentration of a target gas in a gas sample that further comprises a disturbance gas. The thermal sensor device comprises first and second measurement structures (1, 2) comprising first and second temperature sensors (TS1, TS2) and a heater element (31) operable to cause heat transfer to the measurement structures through the gas sample. Processing circuitry provides heating power (P_3) to the heater element and derives an output signal (S) based on a response of the temperature sensors to the heating power, the output signal being indicative of a concentration of the target gas in the gas sample. The first and second measurement structures have different heat dissipation capabilities, and the processing circuitry derives the output signal from a weighted difference of temperature signals from the first and second temperature sensors. Thereby, a cross-sensitivity of the output signal to a concentration change of the disturbance gas may be reduced or eliminated.

18 Claims, 7 Drawing Sheets

(56) References Cited

U.S. PATENT DOCUMENTS

| | | | |
|---|---|---|---|
| 8,011,240 B2 | 9/2011 | Von Waldkirch et al. | |
| 8,596,109 B2* | 12/2013 | Stark | G01N 25/18 |
| | | | 73/25.02 |
| 8,847,339 B2* | 9/2014 | Merz | H01L 23/5228 |
| | | | 257/419 |
| 10,724,976 B2 | 7/2020 | Rogers et al. | |
| 11,047,846 B2* | 6/2021 | Hedrich | G01N 33/004 |
| 11,454,622 B2* | 9/2022 | Billat | G01N 33/0031 |
| 11,474,056 B2* | 10/2022 | Hornung | G01N 33/225 |
| 2007/0223558 A1 | 9/2007 | Martin et al. | |
| 2014/0208830 A1* | 7/2014 | Buhler | G01N 27/122 |
| | | | 73/31.06 |
| 2020/0333273 A1* | 10/2020 | Hedrich | G01F 1/6888 |
| 2021/0003525 A1 | 1/2021 | Yoshio et al. | |
| 2021/0116281 A1 | 4/2021 | Florin et al. | |

FOREIGN PATENT DOCUMENTS

| | | |
|---|---|---|
| EP | 3367087 A2 | 8/2018 |
| EP | 3 812 753 A1 | 4/2021 |

\* cited by examiner

THERMAL SENSOR DEVICE AND METHOD FOR DETERMINING A CONCENTRATION OF A TARGET GAS IN A GAS SAMPLE

TECHNICAL FIELD

The present invention relates to a thermal sensor device for determining a concentration of a target gas in a gas sample that further comprises a disturbance gas. The present invention further relates to a corresponding method.

PRIOR ART

From the prior art it is known to determine various properties of a fluid using a thermal sensor device comprising a heater and one or more temperature sensors. The heater and the temperature sensors can be disposed on a thin membrane (see, e.g., U.S. Pat. No. 7,188,519B2) or on separate bridges spanning an opening or recess of a substrate (see, e.g., EP3367087A2). The sensor device is exposed to the fluid, the heater is provided with heating power, and the steady-state response and/or transient response of the temperature sensors to the heating power is measured. Heat transfer between the heater and the temperature sensors is influenced by heat transfer through the fluid. On this basis, one or more heat transfer properties of the fluid, such as its thermal conductivity and/or specific heat capacity, can be determined. It is also known to determine fluid properties by monitoring the resistance of a heater while heating power is supplied to the heater (see, e.g., U.S. Pat. No. 6,079,253A). In this case, the heater itself acts as a temperature sensor for the heater temperature, thus obviating the need for a separate temperature sensor.

An important field of application is the determination of a concentration of a target gas in a gas sample. Since the components of the gas sample generally have different heat transfer properties, the measured heat transfer properties of the gas sample generally depend on the composition of the gas sample. Provided that the gas sample is a binary mixture of a carrier gas and the target gas, the concentration of the target gas can be directly derived from the measured heat transfer properties of the gas sample. However, a gas sample will often consist not only of the carrier gas and the target gas, but it may also contain a variable and unknown amount of an additional gas, which will in the following be called a "disturbance gas". Variations of the concentration of the disturbance gas may compromise the accuracy of the concentration measurement of the target gas.

Typical situations include:
- $CO_2$ concentration measurements in air for monitoring indoor air quality. Here, the target gas is $CO_2$, the carrier gas is dry air, and the disturbance gas is water vapor. The concentration of water vapor may vary widely depending on location, weather conditions etc., strongly affecting the heat transfer properties of the air.
- Leakage detection of halocarbon refrigerants such as R32, R454b, etc. Here, the target gas is the refrigerant, the carrier gas is dry air, and the disturbance gas is again water vapor.
- Leakage detection of $H_2$ (e.g., for detecting battery failure). Here, the target gas is $H_2$, the carrier gas is dry air, and the disturbance gas is again water vapor.
- $O_2$ concentration measurement in ventilators. Here, the target gas is $O_2$, the carrier gas may be, e.g., $N_2$, and the disturbance gas is again water vapor.

In addition to cross-sensitivities to disturbance gases, thermal sensors often also exhibit cross-sensitivities to temperature and pressure changes. The most direct way to deal with these cross-sensitivities is to use additional sensors for the disturbance gases (e.g., a humidity sensor), a temperature sensor and a pressure sensor, and to compensate the output signal of the thermal sensor accordingly. However, to reduce cost and achieve higher accuracy, it is desirable to reduce or eliminate these cross-sensitivities intrinsically in the thermal measurement itself.

SUMMARY OF THE INVENTION

It is an object of the present invention to provide a thermal sensor device for determining the concentration of a target gas in a gas sample, the device having reduced cross-sensitivity to concentration changes of a disturbance gas.

The invention provides a thermal sensor device that is configured to determine a concentration of a target gas in a gas sample that further comprises a disturbance gas. The thermal sensor device comprises:
- a first measurement structure comprising a first temperature sensor for determining a first temperature signal, the first temperature signal being indicative of a temperature of the first measurement structure;
- a second measurement structure comprising a second temperature sensor for determining a second temperature signal, the second temperature signal being indicative of a temperature of the second measurement structure;
- at least one heater element operable to cause heat transfer to the first and second measurement structures through the gas sample; and
- processing circuitry configured to provide heating power to the at least one heater element and to derive an output signal based on a response of the first and second temperature signals to the heating power, the output signal being indicative of a concentration of the target gas in the gas sample.

According to the present invention, the first and second measurement structures have different heat dissipation capabilities, i.e., when heat is transferred to these measurement structures through the gas sample, these measurement structures dissipate the heat to the environment with different efficiencies. The processing circuitry is configured to derive the output signal based on a weighted difference of the first and second temperature signals. The weighted difference is advantageously formed with weights such that a sensitivity of the output signal to concentration changes of the disturbance gas is eliminated or at least reduced. The sensitivity of the output signal to concentration changes of the disturbance gas is considered to be "reduced" if the ratio of the sensitivities of the output signal to concentration changes of the disturbance gas and the target gas is lower than if the output signal were based on the first or second temperature signal only. In particular, the weights for the first and second temperature signals may have a ratio that is an inverse of a ratio of sensitivities of the first and second temperature signals to concentration changes of the disturbance gas at predetermined reference conditions. Thereby, the sensitivity of the output signal to concentration changes of the disturbance gas is eliminated at these reference conditions.

The invention is based on the realization that, for a given heat flow rate to a measurement structure, the sensitivity of the temperature of the measurement structure to concentration changes of a gas depends on the heat dissipation capability of the measurement structure, and that this dependence is different for different gases. If the sensitivities of the temperatures of each measurement structure to concentration changes of the target gas and the disturbance gas are known, e.g. from simulations or from calibration measurements, the weights in the weighted difference can be readily chosen such that the sensitivity of the weighted difference to concentration changes of the disturbance gas is reduced or eliminated. In practice, the optimum weights will depend on the heat dissipation capabilities of the measurement structures, on the location of the at least one heater element relative to the measurement structures, and on the heating power applied to the at least one heater element.

In preferred embodiments, the sensor device comprises a substrate having an opening or recess, and the first and second measurement structures are first and second measurement bridges that span the opening or recess. The first and second measurement bridges then differ with respect to dimensions and/or structure such that they have different heat dissipation capabilities. In particular, the first measurement bridge may have a first width and a first thickness and may comprise a first layer stack. Similarly, the second measurement bridge may have a second width and a second thickness and may comprise a second layer stack. The second width may then be different from the first width, the second thickness may be different from the first thickness, and/or the second layer stack may have a different layer structure than the first layer stack, such that the first and second measurement bridges have different heat dissipation capabilities.

The heat dissipation capability of a measurement bridge may be quantified by its thermal conductance. The thermal conductance of a measurement bridge is to be understood as the rate of steady state heat flow from the measurement bridge into the substrate that is induced by a unit temperature difference between the center of the bridge and the substrate. The SI unit of thermal conductance is W/K. Thermal conductance is the reciprocal of thermal resistance, which is the temperature difference between the center of the bridge and the substrate when a unit of heat energy flows from the measurement bridge into the substrate per unit of time. Thermal conductance thus quantifies the capability of a measurement bridge to dissipate heat from the gas sample into the substrate, the substrate acting as a heat sink with very large heat capacity.

In some embodiments, the sensor device is configured to form the weighted difference of the temperature signals in hardware. To this end, the processing circuitry may comprise an analog-to-digital converter (ADC) having an analog voltage input. Each of the first and second temperature sensors may be a thermopile having a plurality of pairs of thermocouple junctions. Each pair may comprise a first ("hot") junction that is in thermal contact with the respective measurement bridge, and a second ("cold") junction that is in thermal contact with the substrate. The first temperature sensor may then be connected in an anti-series configuration with the second temperature sensor to obtain a voltage difference that is indicative of the weighted difference of the first and second temperature signals, and the analog voltage input of the ADC may be configured to receive said voltage difference or another voltage that is indicative of (in particular, linear with) said voltage difference (e.g., the voltage difference plus or minus an offset compensation voltage, see below, or a voltage that results from linear amplification of said voltage difference). In this manner, the weighted difference of the first and second temperature signals is formed in hardware, and only one single ADC is required. In such embodiments, the weights of the weighted difference are determined by the number of pairs of thermocouple junctions in each of the first and second temperature sensors.

In some embodiments, the sensor device comprises a separate heater bridge that spans the opening or recess, the heater bridge being arranged at a first distance from the first measurement bridge and at a second distance from the second measurement bridge, the heater bridge comprising the at least one heater element. The measurement bridges are thus separated from the heater bridge by gaps, and heat transfer from the heater bridge to the measurement bridges takes place through the gas sample across the gaps. In preferred embodiments, the heater bridge is arranged between the first and second measurement bridges; however, in alternative embodiments, both measurement bridges may be arranged on the same side of the heater bridge at different distances from the heater bridge.

In some embodiments, the heater bridge comprises a third temperature sensor for determining a third temperature signal, the third temperature signal being indicative of a temperature of a first portion of the heater bridge, and the processing circuitry is configured to carry out a normalization when deriving the output signal, using the third temperature signal. In this manner, the influence of heater drifts on the output signal can be minimized.

The sensor device may be configured to not only form the weighted difference in hardware, but also to carry out the normalization operation in hardware. To this end, the above-mentioned ADC may have a reference voltage input, and the reference voltage input may be configured to receive a voltage that is indicative of the third temperature signal. As an added advantage of such a hardware implementation, common mode noise is reduced. In such embodiments, it is advantageous if the third temperature sensor is a thermopile as well; however, any other type of temperature sensor may be employed, e.g., a resistive temperature sensor or a device that measures the resistance of the heater element itself.

In some embodiments, the heater bridge additionally comprises a fourth temperature sensor for determining a fourth temperature signal, the fourth temperature signal being indicative of a temperature of a second portion the heater bridge. The processing circuitry may then be configured to reduce an offset of the output signal using the fourth temperature signal. In particular, the processing circuitry may be configured to add or subtract a signal that is indicative of (in particular, proportional to) the fourth temperature signal to or from the weighted difference of the first and second temperature signals. The processing circuitry may further be configured to normalize a result of said addition or subtraction by a signal that is indicative of (in particular, proportional to) the third temperature signal. In this manner, the influence of heater drifts on the output signal and an offset of the output signal can be minimized simultaneously.

The sensor device may be configured to carry out this addition or subtraction operation in hardware as well. To this end, the fourth temperature sensor may be a thermopile as well, and the fourth temperature sensor may be connected in a series or anti-series configuration with the first and second temperature sensors to obtain an offset-compensated voltage difference that is indicative of the weighted difference of the first and second temperature signals while having reduced offset. The analog voltage input of the ADC may then be configured to receive said offset-compensated voltage difference or another voltage that is indicative of (in particular, linear with) said voltage difference. Normalization by the third temperature signal may then again be carried out by using a voltage that is indicative of the third temperature signal as the reference voltage of the ADC.

In summary, a particularly advantageous hardware implementation therefore combines the above-mentioned features as follows: Each of the first, second, and fourth temperature sensors is a thermopile having a plurality of pairs of thermocouple junctions. The processing circuitry comprises an analog-to-digital converter having an analog voltage input and a reference voltage input. The first and second temperature sensors are connected in an anti-series configuration, and the fourth temperature sensor is connected in a series or anti-series configuration with this configuration of the first and second temperature sensors, to obtain an offset-compensated voltage difference that is indicative of the weighted difference of the first and second temperature signals while having reduced offset. A voltage that is indicative of (in particular, linear with) said offset-compensated voltage difference is fed to the analog voltage input of the analog-to-digital converter, and a voltage that is indicative of the third temperature signal is fed to the reference voltage input of the analog-to-digital converter.

In addition to achieving reduced sensitivity to changes in the concentration of a disturbance gas, it is also possible to achieve a reduced sensitivity to changes in pressure. To this end, each of the distances between the heater bridge and the measurement bridges may be in a range where the so-called Knudsen effect affects both the first and second temperature signals, i.e., in a range between 2 and 100 micrometers. The Knudsen effect is the phenomenon that the effective thermal conductivity of a gas in a microstructure depends on the geometrical dimensions of the microstructure when these geometrical dimensions are comparable to the mean free path of the gas molecules. Since the mean free path depends on the pressure, the effective thermal conductivity depends on pressure. By tuning the geometry of the sensor device in addition to the thermal properties of the measurement bridges, it is therefore possible to simultaneously reduce or even eliminate the dependence on the disturbance gas and the pressure dependence. Specifically, when different distances within the range between 2 and 100 micrometers are chosen, pressure changes will affect the first and second temperature signals differently. When the weighted difference of the first and second temperature signals is formed, a sensitivity of the output signal to pressure changes may thus be reduced or eliminated at the same time as reducing or eliminating the sensitivity to changes of concentration of the disturbance gas. The optimum distances can readily be determined by simulations of the heat equation employing the Knudsen temperature-jump boundary condition at solid-gas interfaces. They depend, inter alia, on the dimensions of the heater bridge and the measurement bridges and on the type of gas sample.

While in the above-discussed embodiments a separate heater bridge carries the at least one heater element, in other embodiments the at least one heater element may be present on at least one of the measurement structures itself. In particular, the first measurement structure may comprise a first heater element, and the second measurement structure may comprise a second heater element. The processing circuitry may be configured to provide a first heating power to the first heater element and a second heating power to the second heater element, and to derive the output signal based on a weighted difference of a response of the first temperature signal to the first heating power and a response of the second temperature signal to the second heating power. The first and second heating powers may or may not be different, and they may be applied simultaneously or sequentially.

The present invention further provides a method for determining a concentration of a target gas in a gas sample that further comprises a disturbance gas, using the above-described thermal sensor device. The method comprises:

providing heating power to the at least one heater element; and deriving an output signal based on a response of the first and second temperature signals to the heating power, the output signal being indicative of a concentration of the target gas in the gas sample.

Deriving the output signal comprises forming a weighted difference of the first and second temperature signals. As described above, by setting the weights appropriately, a cross-sensitivity of the output signal to a concentration change of the disturbance gas may be reduced or eliminated.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Thermal Sensor Device

Figure 1A:
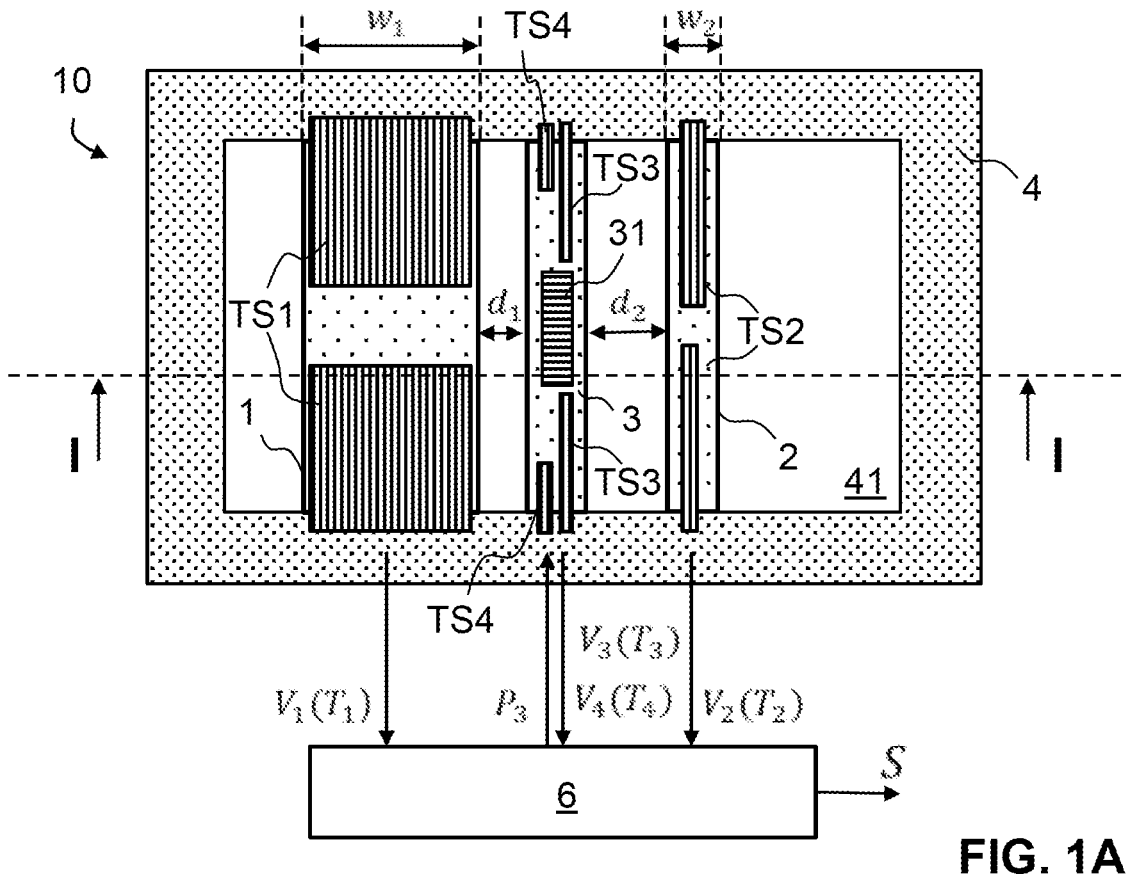
FIG. 1A shows a thermal sensor device according to a first embodiment in a schematic top view (not to scale)
Figure 1B:
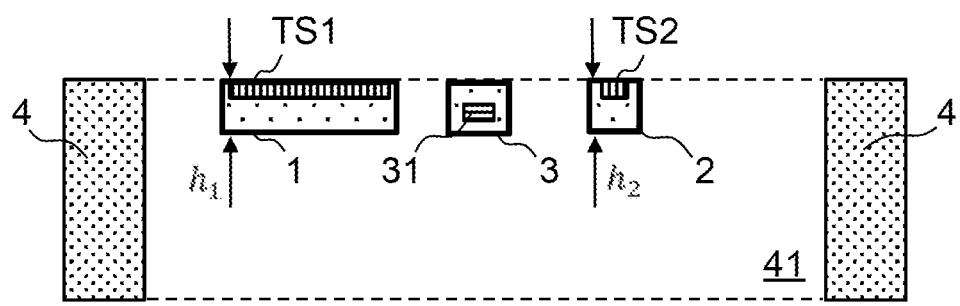
FIG. 1B shows the thermal sensor device in FIG. 1A in a sectional view in plane I-I.

FIG. 1A shows, in a schematic manner, a thermal sensor device according to a first embodiment in a top view. FIG. 1B shows the thermal sensor device of the first embodiment in a sectional view in plane I-I.

The thermal sensor device comprises a thermal sensor element 10 connected to processing circuitry 6. The thermal sensor element 10 comprises a substrate 4 in the form of a semiconductor chip, in particular, a silicon chip. An opening or recess 41 has been formed in the silicon chip. A plurality of bridges span this opening or recess 41, the ends of the bridges being anchored in or on the substrate and being suspended over the opening or recess 41. The bridges are mutually separated by voids (gaps). The bridges are arranged in a common plane, in the following called the "device plane". Each bridge may be formed by a plurality of dielectric layers, metal layers and/or polysilicon layers patterned from a layer stack on the substrate 4. The stack may be a CMOS layer stack. The layer stack may have been applied to the semiconductor chip and processed by typical CMOS methodology, as it is well known in the art. Further details about the setup and fabrication of a sensor device comprising several bridges than span a recess or opening are disclosed in EP3367087A2, whose contents are incorporated herein by reference in their entirety.

In the present example, three bridges 1, 2, 3 are present: two measurement bridges 1, 2 and one heater bridge 3. Each of the measurement bridges 1 and 2 carries a temperature sensor TS1 and TS2, respectively. The heater bridge 3 is arranged between the measurement bridges 1, 2 and carries a heater element 31 as well as two temperature sensors TS3, TS4 at different distances from the heater element 31.

The first measurement bridge 1 has width $w_1$ and thickness $h_1$ and is arranged at a first distance (gap width) $d_1$ from the central heater bridge 3. The second measurement bridge 2 has width $w_2$ and thickness $h_2$ and is arranged at a second distance (gap width) $d_2$ from the central heater bridge 3.

In the present example, each of temperature sensors TS1, TS2, TS3 and TS4 is a thermopile comprising one or more pairs of thermocouple junctions connected in a series configuration, as it is well known in the art. One junction of each pair (the "hot junction") is arranged on the respective bridge, and one junction (the "cold" junction) is arranged on the substrate, which effectively acts as a heat sink with very large heat capacity and may therefore be assumed to have the same temperature for all temperature sensors. The output voltage $V_1$, $V_2$, $V_3$, and $V_4$ of each thermopile is proportional to the temperature difference $T_1$, $T_2$, $T_3$, and $T_4$, respectively, between the hot and cold junctions of the respective thermopile and is therefore indicative of the respective temperature at the hot junctions. For a given temperature difference between the hot and cold junctions, the output voltage $V_1$, $V_2$, $V_3$, $V_4$ of each thermopile is determined by the number of pairs of junctions in the thermopile and the Seebeck coefficients of the materials at the junctions.

Operation of the Thermal Sensor Device

In operation, the sensor element 10 is exposed to a gas sample that comprises a carrier gas and a target gas. The gas sample may further comprise a disturbance gas. In the following, without loss of generality, it will be assumed that the carrier gas is dry air, that the target gas is some gas of interest that is present in the carrier gas, such as $CO_2$ or a refrigerant (e.g., a halocarbon compound), and that the disturbance gas is water vapor. However, the same concept can as well be applied to any carrier gas, target gas and disturbance gas as long as the thermal conductivities of the target gas and disturbance gas have different temperature coefficients.

The processing circuitry 6 supplies the heater element 31 with heating power $P_3$ and reads out the output voltages $V_3$, $V_4$ of the temperature sensors TS3, TS4 on the heater bridge 3. The processing circuitry may further be configured to determine the resistance of the heater element 31 for the purpose of determining a temperature of the heater element 31 itself. In this case, the separate temperature sensor 3 may be omitted. The processing circuitry 6 further reads out the output voltages $V_1$, $V_2$ of the temperature sensors TS1, TS2 on the sensor bridges 1, 2.

Heat Transport Through Measurement Bridges

When the heater element 31 is heated, heat flow occurs from the heater bridge 3 through the gas sample into each of the measurement bridges 1, 2. Heat received at the surface of each measurement bridge further flows towards both ends of the respective measurement bridge along its length to the substrate 4, which effectively acts as a heat sink with very large heat capacity. In this manner, each measurement bridge dissipates heat that is has received from the heater bridge 3 into the substrate 4.

The heat dissipation capability or thermal conductance of each measurement bridge is influenced by its dimensions and structure. In the present example, width $w_1$ is significantly larger than width $w_2$, causing the first measurement bridge 1 to have substantially larger thermal conductance than the second measurement bridge 2. Another possibility for tailoring the thermal conductance is to use different materials or different structures in layered systems. In particular, the measurement bridges may comprise one or more metallization layers, and the number and/or area of the metallization layers may be different between the measurement bridges. At least one of these metallization layers may be used for forming the thermocouples of the thermopiles.

Compensation of Influence of Disturbance Gas

The sensor device achieves compensation of the influence of the disturbance gas (here: humidity compensation) based on the fact that the sensitivity of the temperature sensors TS1, TS2 on the measurement bridges 1, 2 to changes in the gas concentration of either the target or the disturbance gas (here: humidity) depends on the heat dissipation capability of the respective measurement bridge, or equivalently, on its thermal conductance. It is therefore possible to get rid of the dependence on the disturbance gas by considering a differential signal formed from the signals of the temperature sensors of two measurement bridges having different heat dissipation capabilities or, equivalently, having different thermal conductances.

While the applicant does not wish to be bound by theory, the following explanation of the theoretical background is offered.

Let us denote the temperature signals measured by the temperature sensors TSi as $T_i$. Each such temperature signal corresponds to the difference between the absolute temperature on respective bridge and the absolute temperature of the substrate. In the following discussion, all references to a temperature are therefore to be understood as relating to a temperature difference relative to the substrate. In the following, we consider the temperature signal $T_i$ on the measurement bridge i (i=1, 2) normalized by the temperature signal $T_3$ measured on the heater bridge. The advantage of considering the ratio $T_i/T_3$ is the superior stability against heater drifts. Furthermore, the ratio can be obtained directly in hardware by using the output voltage $V_3$ of temperature sensor TS3 as a reference voltage in the A/D converter (see further discussion in conjunction with FIG. 6 below). However, the following discussion also holds without such normalization of the temperature signals $T_i$ (i=1, 2).

For any given conditions (composition of the gas mixture, pressure and temperature), the sensitivity $$Z_{Gas,i} = \frac{\partial}{\partial x_{Gas}}\left(\frac{T_i}{T_3}\right)$$

of the ratio $T_i/T_3$ (i=1, 2) to a change in the concentration $x_{Gas}$ of a specific gas (the target gas or the disturbance gas) in the gas mixture can be expanded in orders of the heating power P. To a good approximation, the linear function is accurate enough:

$$Z_{Gas,i} \approx A_{Gas,i}\left(\frac{P}{P_{Gas,i}} - 1\right). \quad (1)$$

Here, $A_{Gas,i}$ is a constant factor that depends on the thermal properties of the gas mixture and of the measurement bridge while being independent of the heating power P, and $P_{Gas,i}$ denotes the heating power for which the sensitivity vanishes for that specific gas and specific measurement bridge (i.e., for which $Z_{Gas,i}=0$).

The term linear in P in Eq. (1) enters because of the over-temperature effect, i.e., the change of the thermal conductivity of the gas mixture due to the increased effective gas temperature at higher heating power. The coefficient $1/P_{Gas,i}$ of this term is linear in the linear temperature coefficient $$\alpha = \frac{1}{k}\frac{\partial k}{\partial T}$$

of the thermal conductivity k of the carrier gas, and it is linear in the change of the temperature coefficient $\alpha$ with the concentration of the admixed gas, $\alpha' = \partial\alpha/\partial x_{Gas}$. The coefficient $1/P_{Gas,i}$ further depends on the thermal properties of the measurement bridge, in particular, on its thermal conductance. The power $P_{Gas,i}$ at which the sensitivity vanishes has the meaning of a heating power P if $P_{Gas,i}>0$ or of a cooling power if $P_{Gas,i}<0$.

Figure 2:
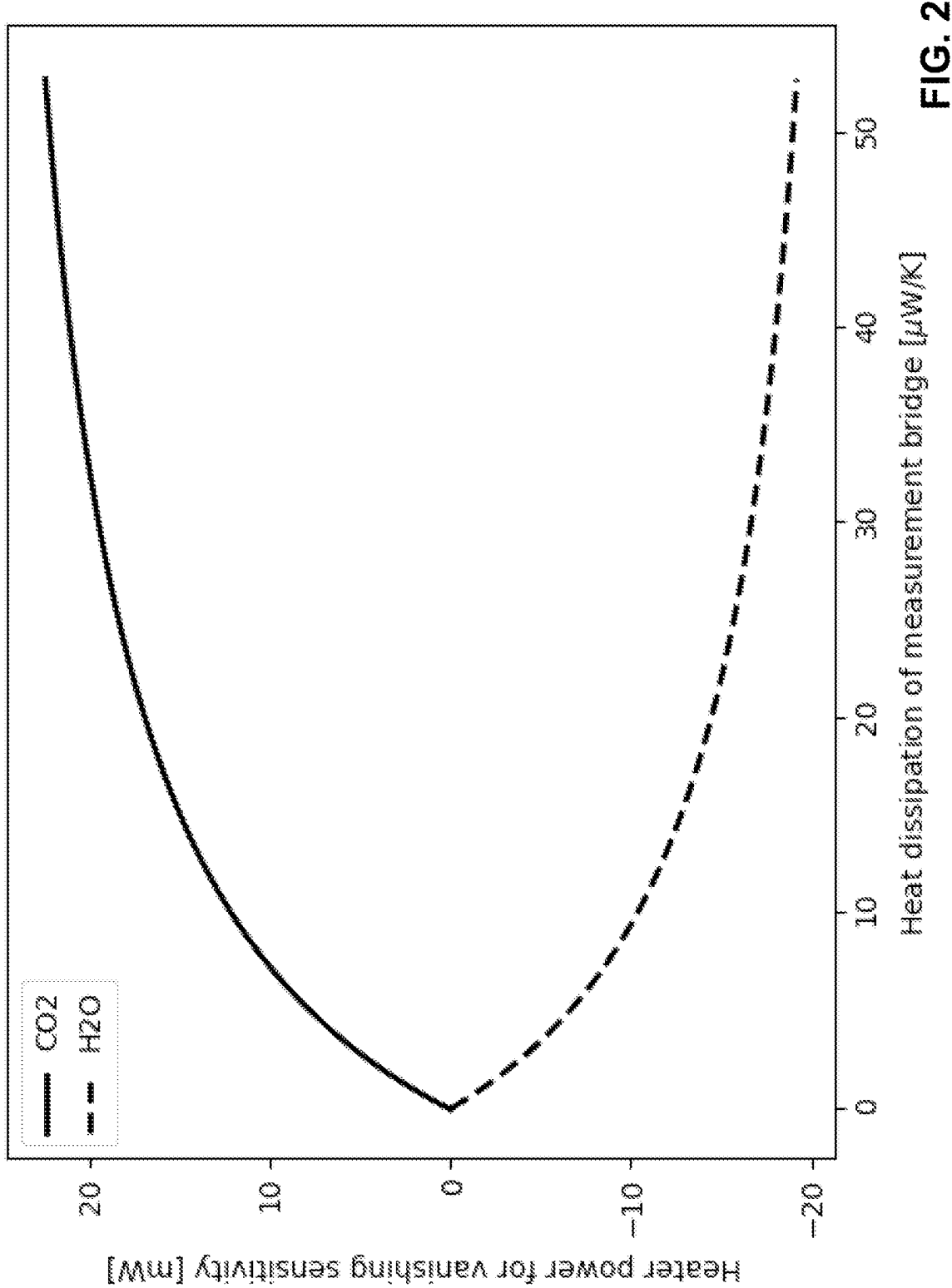
FIG. 2 shows a schematic diagram that illustrates the heating power required for causing the sensitivity of a temperature sensor on a measurement bridge to CO2 (solid line) and H2O (broken line) to vanish, as a function of the heat dissipation of the measurement bridge.

The dependence of $P_{Gas,i}$ on the thermal properties of the measurement bridge is schematically illustrated in FIG. 2. As apparent from the Figure, the power $P_{CO2,i}$ at which the sensitivity to the $CO_2$ concentration vanishes is positive and increases with increasing heat dissipation capability (or, equivalently, thermal conductance) of the measurement bridge. On the other hand, the corresponding value $P_{H2O,i}$ for $H_2O$ is negative and decreases further with increasing heat dissipation capability.

Figure 3:
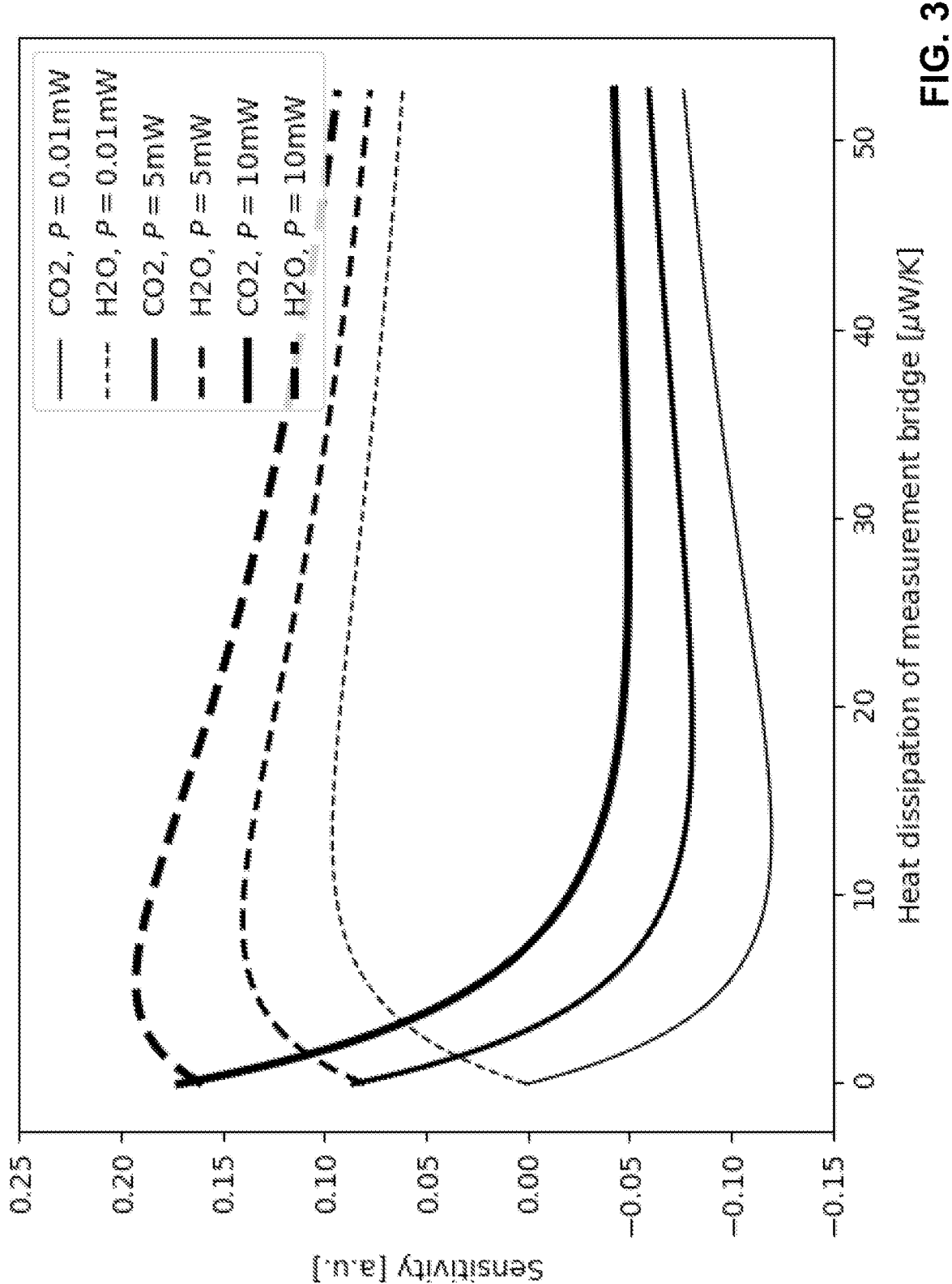
FIG. 3 shows a schematic diagram that illustrates the sensitivities of a temperature sensor on a measurement bridge to CO2 (solid lines) and H2O (broken lines) as a function of the heat dissipation of the measurement bridge for various levels of heating power.
Figure 4:
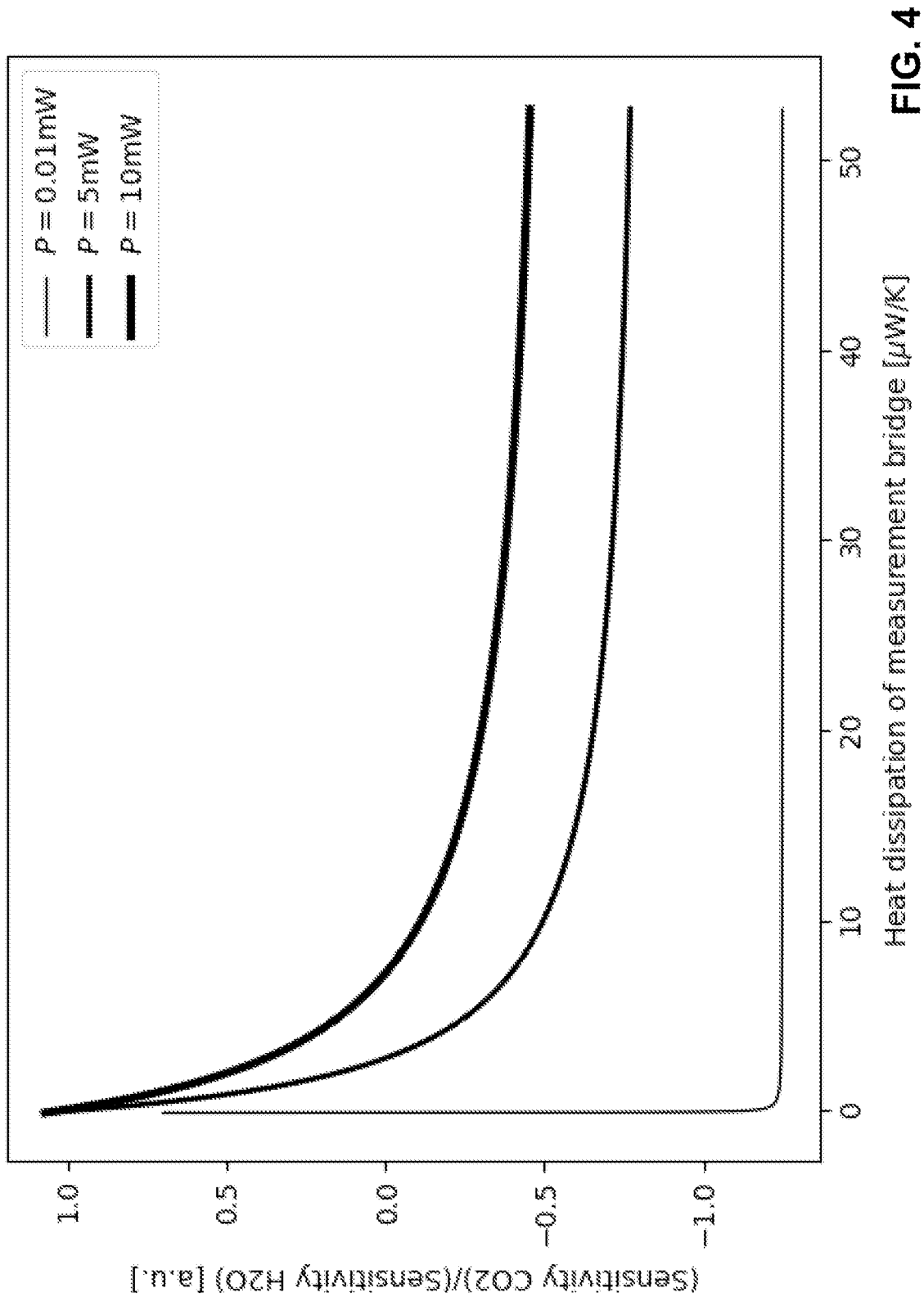
FIG. 4 shows a schematic diagram that illustrates the ratio of the sensitivities of a temperature sensor on a measurement bridge to CO2 and H2O for various levels of heating power.

Crucially, as illustrated in FIG. 3, the dependence of the sensitivity $Z_{Gas,i}$ on the heat dissipation capability of the measurement bridge at a fixed heating power $P\neq0$ depends on the considered gas. In particular, as shown in FIG. 4, the ratio of the sensitivities $Z_{CO2}/H_{H2O}$ as a function of the heat dissipation capability is not constant if the heating power $P\neq0$.

This offers the possibility to compensate for the disturbance gas in the raw signal by considering the temperature signals of two measurement bridges with different thermal conductances at a fixed value of the heating power and considering a weighted difference between these temperature signals as follows:

$$S = \frac{\alpha_2 T_2 - \alpha_1 T_1}{T_3}.$$

It is possible to choose a ratio $\alpha_2/\alpha_1$ of the weights $\alpha_1$, $\alpha_2$ with $\alpha_2/\alpha_1>0$ such that S at predetermined reference conditions (composition of the gas mixture, pressure and temperature) is insensitive to changes in the concentration of the disturbance gas (e.g., water vapor):

$$\left.\frac{\partial S}{\partial x_{H2O}}\right|_{Ref} = 0.$$

This condition is met if the following equation holds at the reference conditions:

$$\frac{\alpha_2}{\alpha_1} = \frac{Z_{H2O,1}}{Z_{H2O,2}},$$

i.e., if the ratio of the weights for the temperature signals $T_1$ and $T_2$ is the inverse of the ratio of the sensitivities of these temperature sensors to concentration changes of the disturbance gas.

Even if a different ratio $\alpha_2/\alpha_1$ is chosen, the sensitivity of the signal S with respect to changes in the concentration of the disturbance gas will be reduced as compared to using the temperature signal of a single measurement bridge.

An example that illustrates how the weights may be determined using the information of FIGS. 2, 3 and 4 will be discussed further below. It should be noted that the dependencies in FIGS. 2, 3 and 4 can readily be obtained by standard FEM simulations of heat transport, e.g., using the commercially available software package COMSOL Multiphysics, and that therefore appropriate weights can be readily calculated.

Sequential Operation at Different Heating Powers

In addition to forming a differential signal as discussed above, it is possible to sequentially operate the heater element 31 at different heating powers and to form a weighted difference of the temperature signals measured on each single measurement bridge at the different heating powers. Such a weighted difference may also have a reduced dependency on the concentration of the disturbance gas.

The weighted difference of signals at different heating powers may be used to further improve compensation of the influence of the disturbance gas and/or to carry out a consistency check, enabling the detection of faults of the sensor device.

Pressure Compensation

In addition, it is possible to reduce or even eliminate the sensitivity of the signal S with respect to changes in gas pressure, based on the fact that the effective thermal conductivity of a gas in a microstructure depends on the geometrical dimensions of the microstructure when these geometrical dimensions are comparable to the mean free path of the gas molecules (the so-called "Knudsen effect"). Since the mean free path depends on the pressure, the effective thermal conductivity depends on pressure. By tuning the geometry of the sensor device in addition to the thermal properties of the measurement bridges, it is therefore possible to simultaneously reduce or even eliminate the dependence on the disturbance gas and the pressure dependence.

The Knudsen effect can be characterized by the so-called Knudsen number $$Kn = \frac{l}{R_c}$$

where l designates the mean free path length of the gas particles, and where $R_c$ designates the characteristic dimension of the microstructure in which the heat transfer through the gas is effected. The Knudsen effect is discussed in detail in the following review papers, to which reference is made:
[1] Devienne, F. M., "Low Density Heat Transfer", *Advances in Heat Transfer* (1965 Jan. 1) 2: 271-356.

[2] Springer, George S., "Heat Transfer in Rarefied Gases", *Advances in Heat Transfer* (1971 Jan. 1) 7: 163-218.

The Knudsen effect becomes appreciable when the Knudsen number is larger than approximately 0.001. By tuning the Knudsen number, the sensitivity of the signal S to pressure changes can be minimized. An effective way to tune the Knudsen number is to vary the distances $d_1$ and $d_2$, see FIGS. 1A and 1B, but also the dimensions of the bridges (widths $w_1$, $w_2$ and, to a lesser extent, heights $h_1$, $h_2$) affect the pressure dependence.

For additional information relating to the Knudsen effect in a thermal sensor device, see also EP3812753A1.

Suitable distances and dimensions can be readily determined by simulating heat transport in the sensor element, using, e.g., well-established finite-element methods, and simultaneously optimizing the geometry and the weights $\alpha_1$, $\alpha_2$ such that the signal S has reduced or zero sensitivity both to concentration changes of the disturbance gas and to pressure changes.

To illustrate the optimization procedure of the geometry, we consider an example where we want to optimize the parameters $d_1$ and $w_1$ while keeping all other parameters fixed (including constant $d_2$, $w_2$ and heater power P). A possible optimization procedure may then be algorithmically be described as follows:

For each set of geometrical parameters $\{d_1, w_1\}$:

(i) compute the sensitivities $Z_{H2O,i}$ of the two measurement bridges to $H_2O$ at a fixed reference pressure (and reference temperature) by performing simulations at two or more humidity levels;

(ii) compute the ratio of the signal weights as $$r(d_1, w_1) = \frac{\alpha_2}{\alpha_1} = \frac{Z_{H2O,1}}{Z_{H2O,2}},$$

which defines a humidity-compensated signal $$S(d_1, w_1) = \frac{T_1 - r(d_1, w_1)T_2}{T_3};$$

(iii) perform a simulation at a second pressure to determine the pressure dependence of the humidity-compensated signal for a given set of geometrical parameters $\{d_1, w_1\}$:

$$X(d_1, w_1) = \frac{\partial S(d_1, w_1)}{\partial p};$$

(iv) if the pressure dependence is larger than a threshold, $|X(d_1, w_1)| > \epsilon_{threshold}$, choose a new distance $d_1'$ and repeat steps (i) to (iii); otherwise, if $|X(d_1, w_1)| \leq \epsilon_{threshold}$, we have found a distance $d_1 = d_1(w_1)$ that corresponds to a humidity and pressure compensated sensor element;

(v) perform simulations at different $CO_2$ concentrations to obtain the $CO_2$ sensitivity $$Z_{CO2}(w_1) = \frac{\partial S}{\partial x_{CO2}}$$

of the humidity and pressure compensated sensor element (or another figure of merit, such as signal-to-noise).

(vi) Vary the width $w_1$ and repeat steps (i) to (v) in order to find the width $w_1$ that maximizes the $CO_2$ sensitivity (or SNR).

Of course, this procedure may as well be carried out for any other combinations of target gas and disturbance gas. Furthermore, it is readily apparent that the optimization procedure can be generalized to also include the geometrical parameters $d_2$, $w_2$ and the heater power P.

Offset Compensation

In addition to compensation with respect to the disturbance gas and pressure, a differential signal can be formed that has zero offset at predetermined reference conditions. This is particularly advantageous if the differential signal is formed in hardware, because in this case the gain of the analog signal processing chain (i.e., amplification and analog-to-digital conversion) can be maximized without risking saturation.

For achieving offset compensation, the signal $T_4$ of the temperature sensor TS4 may be used. In particular, the ratio $T_4/T_3$ is essentially independent of humidity, pressure, and target gas concentration, and the following differential signal may be formed:

$$S = \frac{\alpha_2 T_2 - \alpha_1 T_1 - \alpha_4 T_4}{T_3}.$$

The sensor design, the heating power and the weights $\alpha_i$ are then advantageously optimized such that for predetermined reference conditions (composition of the gas mixture, pressure, and temperature) the signal S has the following properties:

(1) The signal S is insensitive to changes in the disturbance gas (e.g., water vapor)

$$\left.\frac{\partial S}{\partial x_{H2O}}\right|_{Ref} = 0.$$

(2) The signal S is insensitive to changes in pressure $$\left.\frac{\partial S}{\partial p}\right|_{Ref} = 0.$$

(3) The signal S has vanishing offset $$S|_{Ref} = 0.$$

(4) The signal S has a sensitivity (or signal to noise) to changes in the target gas that is as high as possible:

$$\left.\frac{\partial S}{\partial x_{target}}\right|_{Ref} = \max.$$

The most relevant optimization parameters are:
a) the heating power P;
b) the thermal properties of the measurement bridges (as influenced by their widths $w_1$, $w_2$ and their material properties);
c) the distances $d_1$ and $d_2$ between the heater bridge and the measurement bridges; and d) the relative weights $\alpha_1/\alpha_2 > 0$, $\alpha_4/\alpha_1 \geq 0$, and/or the location of the temperature measurements.

Optimization can be carried out in a similar spirit as described above for pressure compensation.

Processing Circuitry

Figure 5:
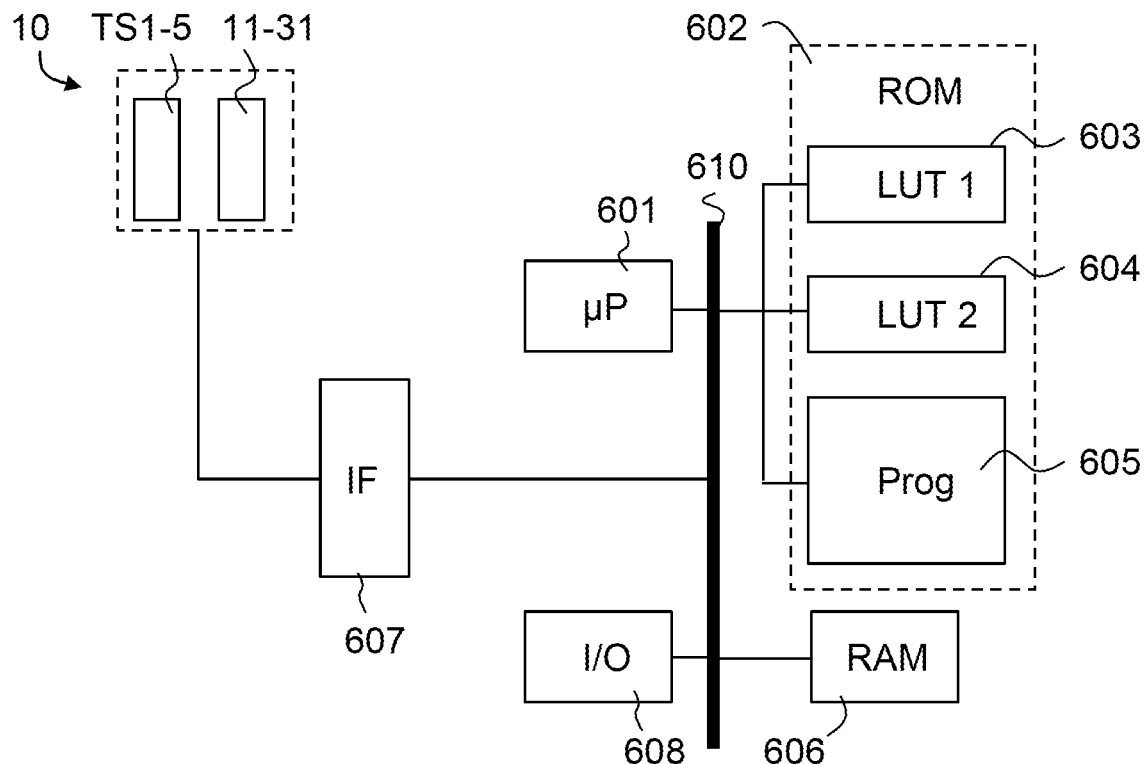
FIG. 5 shows a schematic block diagram of processing circuitry that may be used in a thermal sensor device.

FIG. 5 illustrates, in a highly schematic manner, a block diagram of a possible embodiment of the processing circuitry 6. The processing circuitry comprises a processor (µP) 601, a non-volatile (e.g., Flash ROM) memory 602, and a volatile (RAM) memory 606. The processor µP communicates with the memory devices 602, 606 via a bus 610. The non-volatile memory 602 stores, inter alia, plural lookup tables (LUT), only two such lookup tables 603, 604 being illustrated. The lookup tables may store, for instance, calibration data relating the differential signal S to actual concentrations of selected target gases. The non-volatile memory 202 further stores a machine-executable program (Prog) 605 for execution in the processor µP. Via a device interface (IF) 607, the processing circuitry 6 drives the heater elements 11-31 and reads out the various temperature sensors TS1-TS5. A wired or wireless input/output interface I/O 608 enables communication to the outside world.

The processing circuitry 6 may be completely integrated on the same silicon chip as the sensing element 10, or at least parts of the processing circuitry 6 may be implemented separately from the sensing element 10.

Hardware Implementation of Differential Signal

Figure 6:
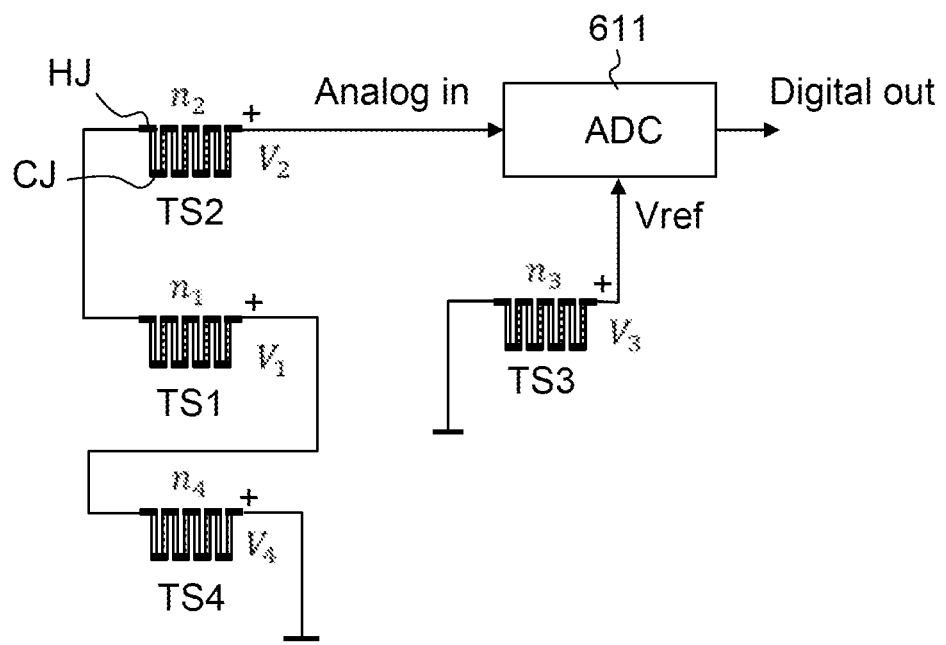
FIG. 6 shows a schematic block diagram of a hardware implementation of forming a differential signal.

FIG. 6 illustrates how the differential signal $$S = \alpha_2 T_2 - \alpha_1 T_1 - \alpha_4 T_4 / T_3$$

can be implemented in hardware.

As already discussed above, each of temperature sensors TS1, TS2, TS3 and TS4 may be a thermopile comprising one or more pairs of thermocouple junctions connected in a series configuration, each pair consisting of a "hot junction" HJ and a "cold junction" CJ, and the output voltage of each thermopile is proportional to the number of pairs of junctions in the thermopile.

In the example of FIG. 6, the temperature sensors TS1 and TS4 are connected in anti-series configuration with the temperature sensor TS2. Assuming the same Seebeck coefficients for all temperature sensors, the resulting output voltage $V_2 - V_1 - V_4$ of the combination of temperature sensors TS1, TS2 and TS4 is proportional to $n_2 T_2 - n_1 T_1 - n_4 T_4$. This voltage is fed to the input of an analog-to-digital converter (ADC) 611, possibly after linear amplification. The output voltage $V_3$ of temperature sensor TS3 is proportional to $n_3 T_3$. This voltage is used as a reference voltage Vref for the ADC. Thereby the ADC effectively performs a normalization by $n_3 T_3$. The resulting digital output of the ADC is proportional to $$S = \frac{n_2 T_2 - n_1 T_1 - n_4 T_4}{n_3 T_3} = \frac{\alpha_2 T_2 - \alpha_1 T_1 - \alpha_4 T_4}{T_3}$$

with $\alpha_i = n_i/n_3$ for $i = 1, 2, 4$. By choosing appropriate numbers $n_1$, $n_2$, $n_3$ and $n_4$ of pairs of junctions, any desired combination of coefficients $\alpha_i$ can be approximated in hardware.

The implementation of the signal S in hardware may be further improved by additionally varying the location of the hot junctions of the thermopiles. In other words, for fixed values of $n_1$, $n_2$, $n_3$ and $n_4$, the temperature values $T_1$, $T_2$ and $T_4$ are optimized to reach the best performance.

The ADC 611 can be of any type, such as a successive-approximation ADC, a delta-encoded ADC or a sigma-delta converter. All such converter designs require a reference voltage Vref and generate a digitized value of the input voltage, normalized by Vref. In addition to simplicity and insensitivity to heater drifts, an added advantage of using the output voltage $V_3$ of temperature sensor TS3 as the reference voltage Vref of the ADC is a reduction in common-mode noise. For more details concerning normalization of the ADC output, reference is made to U.S. Pat. No. 8,011,240B2.

In the following, an example will be discussed. Let us assume that the sensor device is operated at a heating power P=10 mW. According to FIG. 3, the sensitivity $Z_{H2O,1}$ for a measurement bridge 1 that has a thermal conductance of 40 µW/K is approximately 0.11 (in arbitrary units). The sensitivity $Z_{H2O,2}$ for a measurement bridge 2 that has a thermal conductance of 10 µW/K is approximately 0.18. By choosing $$\frac{\alpha_2}{\alpha_1} \approx \frac{Z_{H2O,1}}{Z_{H2O,2}} = \frac{0.11}{0.18} \approx 0.61,$$

the sensitivity $\partial S/\partial x_{H2O}$ to changes in humidity vanishes. This can be achieved by providing $n_1 = 18$ pairs of thermocouple junctions in temperature sensor TS1 and $n_2 = 11$ pairs of thermocouple junctions in temperature sensor TS2. If it turns out in subsequent calibration measurements that humidity compensation is not yet perfect, some additional fine tuning can be achieved by varying the heater power P.

Software Implementation of Differential Signal

Instead of forming a differential signal in analog hardware, as described above, it is also possible to form the differential signal in software after digitization. To this end, separate ADCs may be provided for the temperature sensors TS1 and TS2. Normalization by $T_3$ may advantageously again be carried out in hardware by using the output voltage of temperature sensor TS3 as a reference voltage for the ADCs, or the output voltage of temperature sensor TS3 may be digitized separately, and a numerical division may be carried out in software. The temperature sensor TS4 may be omitted, since offset correction can be readily done in software without an additional temperature signal from TS4.

In such software implementations, the appropriate ratio $\alpha_2/\alpha_1$ does not need to be determined by simulations, but can be readily determined by calibration measurements of the sensitivity of the signal $T_i/T_3$ of each measurement bridge to changes of the concentration of the disturbance gas.

Considerations Relating to Dimensions and Operating Conditions

In general terms, the following considerations as to dimensions and operating conditions apply:

The width $w_2$ should preferably be between 5 µm and 100 µm.

For achieving at least partial compensation as to the concentration of a disturbance gas, the width $w_1$ should preferably be in the range $1.1\, w_2 \leq w_1 \leq 10\, w_2$.

The length of each bridge should preferably be between 5 and 100 times the width $w_2$, or in absolute numbers, preferably between 25 µm and 1'000 µm.

For achieving at least partial pressure compensation, the distances $d_1$ and $d_2$ should preferably be between 2 µm and 100 µm.

The heating power should preferably be in the range between 2 mW and 20 mW.

Exemplary Combinations of Parameters

The following exemplary combinations of parameters achieve both humidity compensation and pressure compensation for air as a carrier gas and water vapor as a disturbance gas:

Example 1: $w_1$=60.5 μm, $w_2$=21 μm, $d_1$=20 μm, $d_2$=42 μm, size of recess=430 μm×200 μm (implying a length of each bridge of 200 μm), heating power 6.5 mW, $n_1$=12, $n_2$=9.

Example 2: $w_1$=71.8 μm, $w_2$=21 μm, $d_1$=18.1 μm, $d_2$=42 μm, size of recess=430 μm×300 μm (implying a length of each bridge of 300 μm), heating power 5.6 mW, $n_1$=9, $n_2$=8.

Example 3: $w_1$=40 μm, $w_2$=21 μm, $d_1$=21 μm, $d_2$=13.6 μm, size of recess=430 μm×200 μm (implying a length of each bridge of 200 μm), heating power 6.5 mW, $n_1$=11, $n_2$=8.

It is readily apparent from the above-described considerations that an infinite number of other combinations of parameters exist for which compensation with respect to a disturbance gas as well as for pressure changes can be achieved.

Alternative Design with Both Measurement Bridges on Same Side of Heater Bridge

Figure 7:
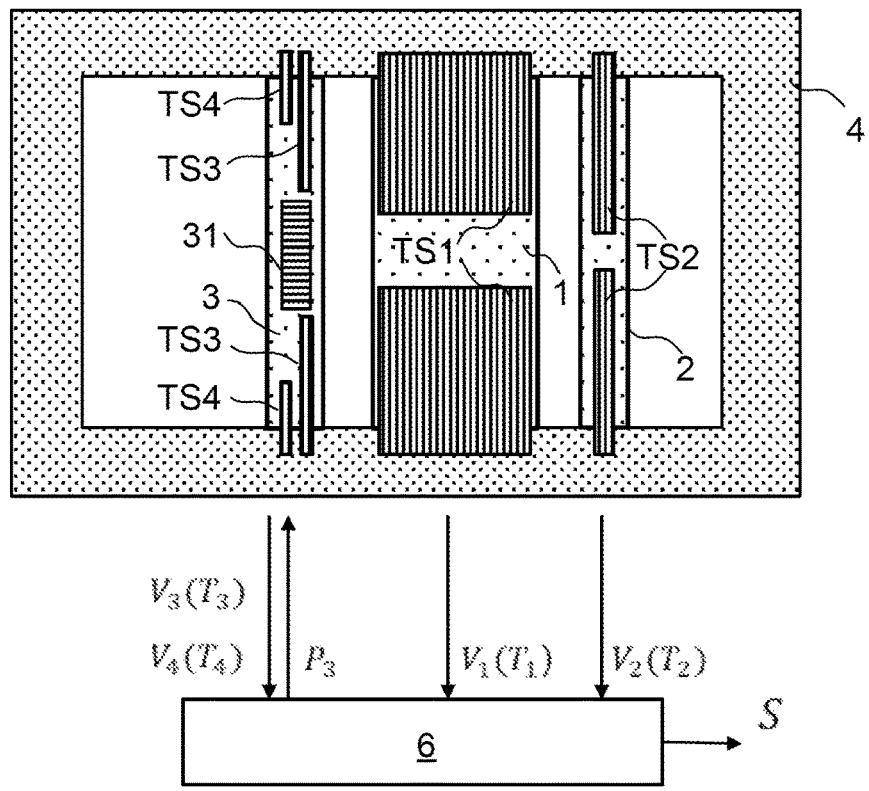
FIG. 7 shows a thermal sensor device according to a second embodiment in a schematic top view (not to scale)

FIG. 7 shows a second embodiment of a sensor device, wherein both measurement bridges 1, 2 are arranged on the same side of the heater bridge 3. It is possible to achieve compensation with respect to a disturbance gas and pressure with this design as well, based on very similar considerations as for a design with a central heater bridge, as in FIGS. 1A and 1B. However, since heat transfer between the heater bridge 3 and the second measurement bridge 2 takes place across a rather large distance, design of FIG. 7 is expected to be somewhat less efficient, resulting in potentially lower signal quality than the design with a central heater bridge.

The positions of the measurement bridges 1, 2 may also be interchanged, such that the narrower measurement bridge 2 is located adjacent to the heater bridge 3.

Four-Bridge Structure with Two Heaters

Figure 8:
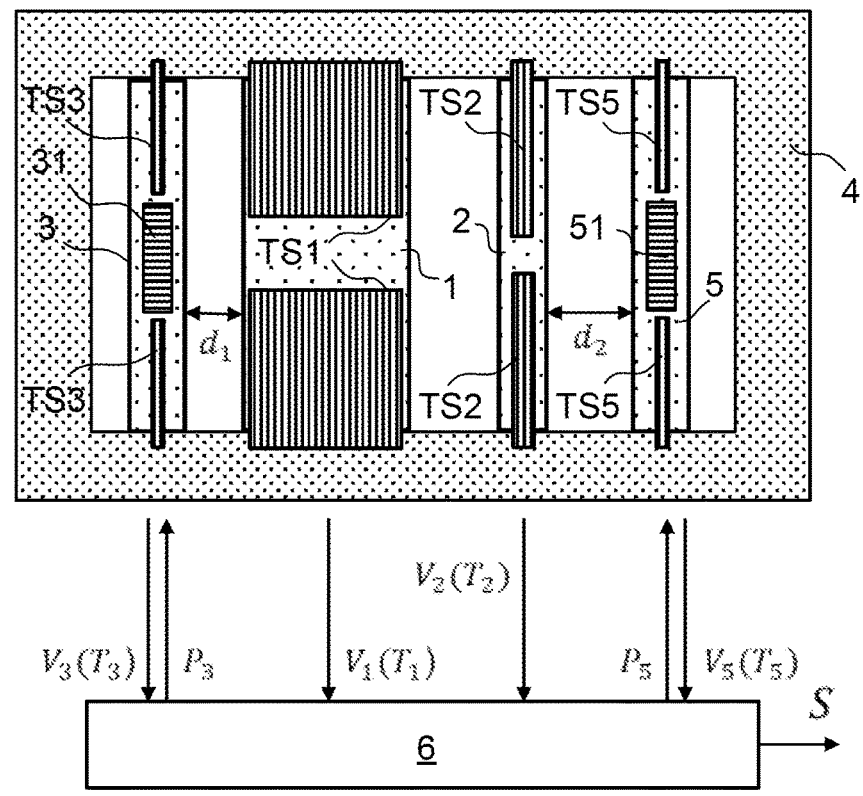
FIG. 8 shows a thermal sensor device according to a third embodiment in a schematic top view (not to scale)

FIG. 8 illustrates a third embodiment of a sensor device, which comprises two heater bridges and two measurement bridges. A first heater bridge 3 with heater element 31 and temperature sensor TS3 for determining a voltage $V_3$ that is indicative of a temperature signal $T_3$ is located proximate to the first measurement bridge 1 at a distance $d_1$. A second heater bridge 5 with heater element 51 and temperature sensor TS5 for determining a voltage $V_5$ that is indicative of a temperature signal $T_5$ is located proximate to the second measurement bridge 2 at a distance $d_2$.

A differential measurement signal can be defined as follows:

$$S = \frac{\alpha_2 T_2}{T_5} - \frac{\alpha_1 T_1}{T_3}.$$

This design has the additional advantage that the two heater elements 31, 51 can be operated at different powers $P_3$, $P_5$, which helps to increase the sensitivity to the target gas. However, the differential measurement signal is not easily obtained in hardware; rather, two ADCs are needed, providing at their digital output a signal proportional to $T_2/T_5$ and $T_1/T_3$, respectively, and the weighted difference would need to be calculated in software based on these digital output signals.

Instead of arranging the measurement bridges 1, 2 between the heater bridges 3, 5, it is also possible to arrange at least one of the heater bridges 3, 5 between the measurement bridges 1, 2.

Two-Bridge Structure with Two Heaters

Figure 9:
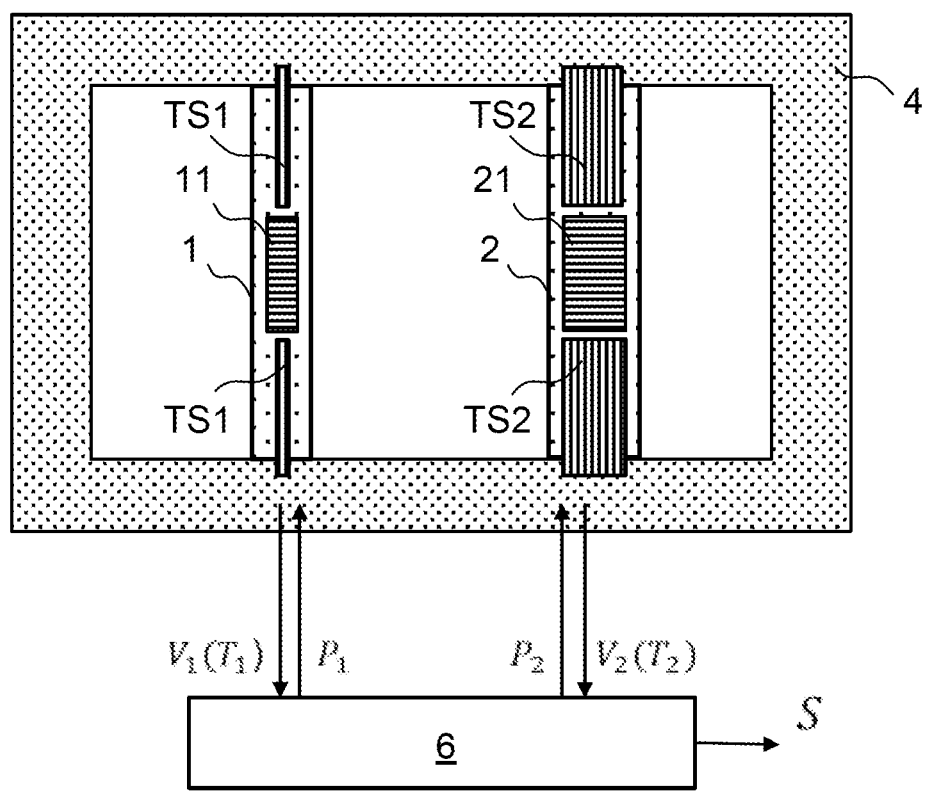
FIG. 9 shows a thermal sensor device according to a fourth embodiment in a schematic top view (not to scale).

FIG. 9 illustrates a fourth embodiment of a sensor device, which comprises only two measurement bridges 1 and 2. Measurement bridge 1 includes a first heater element 11, and measurement bridge 2 includes a second heater element 21. As in the first to third embodiments, the two measurement bridges have different thermal conductances. The heater elements 11, 21 may or may not be operated at different heating powers $P_1$, $P_2$.

In operation, the heater elements are operated simultaneously, and the following signal may be taken as the measurement signal:

$$S = \alpha_2 T_2 - \alpha_1 T_1.$$

While being extremely simple, this embodiment of the sensor device has the disadvantage that no temperature ratios are measured, rendering the results vulnerable to heater drifts, and no pressure compensation is obtained.

Modifications

From the above description it is apparent that the invention is not limited to the above-described exemplary embodiments, and that many modifications are possible.

In particular, while the above-described exemplary embodiments employ a sensor element comprising measurement bridges that span a recess or opening of a substrate, measurement structures other than bridges may be provided, as long as heat from at least one heater element can be transferred to the measurement structures through the gas mixture while avoiding excessive heat transfer through from the heater element to the measurement structures through other pathways. For instance, the measurement structures may be formed on a thin dielectric membrane.

While a hardware embodiment for forming a differential signal has been described, a differential signal may instead be formed in software.

While thermopiles are used as temperature sensors in the above-described exemplary embodiments, in alternative embodiments, other types of temperature sensors may be used, such as resistive temperature sensors (thermistors).

Many more modifications are possible.

The invention claimed is:

1. A thermal sensor device for determining a concentration of a target gas in a gas sample that further comprises a disturbance gas, the thermal sensor device comprising:
   a substrate having an opening or recess,
   a first measurement bridge that spans the opening or recess, the first measurement bridge comprising a first temperature sensor for determining a first temperature signal, the first temperature signal being indicative of a temperature of the first measurement structure;
   a second measurement bridge that spans the opening or recess, the second measurement bridge comprising a second temperature sensor for determining a second temperature signal, the second temperature signal being indicative of a temperature of the second measurement bridge;
   at least one heater element operable to cause heat transfer to the first and second measurement bridges through the gas sample; and
   processing circuitry configured to provide heating power to the at least one heater element and to derive an output signal based on a response of the first and second temperature signals to the heating power, the output signal being indicative of the concentration of the target gas in the gas sample, wherein the first measurement bridge and the second measurement bridge differ with respect to dimensions and/or structure such that the first measurement bridge and the second measurement bridge have different thermal conductances, and wherein the processing circuitry is configured to derive the output signal based on a weighted difference of the first and second temperature signals.

2. The thermal sensor device of claim 1, wherein the processing circuitry is configured to form the weighted difference with weights such that a sensitivity of the output signal to concentration changes of the disturbance gas is reduced or eliminated.

3. The thermal sensor device of claim 1, wherein the processing circuitry is configured to form the weighted difference with weights having a ratio that is an inverse of a ratio of sensitivities of the first and second temperature signals to concentration changes of the disturbance gas at predetermined reference conditions.

4. The thermal sensor device of claim 1,
wherein each of the first and second temperature sensors is a thermopile having a plurality of pairs of thermocouple junctions;
wherein the processing circuitry comprises an analog-to-digital converter having an analog voltage input,
wherein the first temperature sensor is connected in an anti-series configuration with the second temperature sensor to obtain a voltage difference that is indicative of the weighted difference of the first and second temperature signals, and
wherein the analog voltage input of the analog-to-digital converter is configured to receive an input voltage that is indicative of said voltage difference.

5. The thermal sensor device of claim 1,
wherein the first measurement bridge comprises a first heater element,
wherein the second measurement bridge comprises a second heater element, and
wherein the processing circuitry is configured to provide a first heating power to the first heater element and a second heating power to the second heater element, and to derive the output signal based on a weighted difference of a response of the first temperature signal to the first heating power and a response of the second temperature signal to the second heating power.

6. The thermal sensor device of claim 1, further comprising a heater bridge that spans the opening or recess, the heater bridge being arranged at a first distance from the first measurement bridge and at a second distance from the second measurement bridge, the heater bridge comprising the at least one heater element.

7. The thermal sensor device of claim 6, wherein the heater bridge is arranged between the first and second measurement bridges.

8. The thermal sensor device of claim 7,
wherein each of the first and second distances is between 2 and 100 micrometers, and wherein the weighted difference is formed with weights such that a sensitivity of the output signal to pressure changes is reduced or eliminated by the Knudsen effect.

9. The thermal sensor device of claim 1,
wherein the heater bridge comprises a third temperature sensor for determining a third temperature signal, the third temperature signal being indicative of a temperature of a first portion of the heater bridge, and
wherein the processing circuitry is configured to carry out a normalization when deriving the output signal, using the third temperature signal.

10. The thermal sensor device of claim 9,
wherein each of the first and second temperature sensors is a thermopile having a plurality of pairs of thermocouple junctions;
wherein the processing circuitry comprises an analog-to-digital converter having an analog voltage input,
wherein the first temperature sensor is connected in an anti-series configuration with the second temperature sensor to obtain a voltage difference that is indicative of the weighted difference of the first and second temperature signals,
wherein the analog voltage input of the analog-to-digital converter is configured to receive an input voltage that is indicative of said voltage difference,
wherein the analog-to-digital converter has a reference voltage input, and
wherein the reference voltage input is configured to receive a voltage that is indicative of the third temperature signal.

11. The thermal sensor device of claim 9,
wherein the heater bridge comprises a fourth temperature sensor for determining a fourth temperature signal, the fourth temperature signal being indicative of a temperature of a second portion the heater bridge, and
wherein the processing circuitry is configured to reduce an offset of the output signal using the fourth temperature signal.

12. The thermal sensor device of claim 11, wherein the processing circuitry is configured to add or subtract a signal that is proportional to the fourth temperature signal to or from the weighted difference of the first and second temperature signals and to divide a result of said addition or subtraction by a signal that is proportional to the third temperature signal.

13. The thermal sensor device of claim 11,
wherein each of the first and second temperature sensors is a thermopile having a plurality of pairs of thermocouple junctions;
wherein the fourth temperature sensor is a thermopile having a plurality of pairs of thermocouple junctions;
wherein the fourth temperature sensor is connected in a series or anti-series configuration with the first and second temperature sensors to obtain an offset-compensated voltage difference that is indicative of the weighted difference of the first and second temperature signals while having reduced offset,
wherein the processing circuitry comprises an analog-to-digital converter having an analog voltage input, and
wherein the analog voltage input of the analog-to-digital converter is configured to receive an input voltage that is indicative of said offset-compensated voltage difference.

14. A method for operating the thermal sensor device of claim 1, the method comprising:
providing heating power to the at least one heater element; and
deriving the output signal based on the response of the first and second temperature signals to the heating power,
wherein the output signal is derived from the weighted difference of the first and second temperature signals with weights for the first and second temperature signals having a ratio that is an inverse of a ratio of sensitivities of the first and second temperature signals to concentration changes of the disturbance gas at predetermined reference conditions.

15. A thermal sensor device for determining a concentration of a target gas in a gas sample that further comprises a disturbance gas, the thermal sensor device comprising:
   a first measurement structure comprising a first temperature sensor for determining a first temperature signal, the first temperature signal being indicative of a temperature of the first measurement structure;
   a second measurement structure comprising a second temperature sensor for determining a second temperature signal, the second temperature signal being indicative of a temperature of the second measurement structure;
   at least one heater element operable to cause heat transfer to the first and second measurement structures through the gas sample; and
   processing circuitry configured to provide heating power to the at least one heater element and to derive an output signal based on a response of the first and second temperature signals to the heating power, the output signal being indicative of the concentration of the target gas in the gas sample,
   wherein the first and second measurement structures have different heat dissipation capabilities, and
   wherein the processing circuitry is configured to derive the output signal based on a weighted difference of the first and second temperature signals with weights such that a sensitivity of the output signal to concentration changes of the disturbance gas is reduced or eliminated.

16. The thermal sensor device of claim 15, wherein the processing circuitry is configured to form the weighted difference with weights having a ratio that is an inverse of a ratio of sensitivities of the first and second temperature signals to concentration changes of the disturbance gas at predetermined reference conditions.

17. A thermal sensor device for determining a concentration of a target gas in a gas sample, the thermal sensor device comprising:
   a substrate having an opening or recess,
   a first measurement bridge that spans the opening or recess, the first measurement bridge comprising a first temperature sensor for determining a first temperature signal, the first temperature signal being indicative of a temperature of the first measurement bridge;
   a second measurement bridge that spans the opening or recess, the second measurement bridge comprising a second temperature sensor for determining a second temperature signal, the second temperature signal being indicative of a temperature of the second measurement bridge;
   a heater bridge that spans the opening or recess, the heater bridge being arranged at a first distance from the first measurement bridge and at a second distance from the second measurement bridge, each of the first and second distances being between 2 and 100 micrometers, the heater bridge comprising at least one heater element operable to cause heat transfer to the first and second measurement bridges through the gas sample; and
   processing circuitry configured to provide heating power to the at least one heater element and to derive an output signal based on a response of the first and second temperature signals to the heating power, the output signal being indicative of the concentration of the target gas in the gas sample,
   wherein the first measurement bridge and the second measurement bridge differ with respect to dimensions and/or structure such that the first measurement bridge and the second measurement bridge have different thermal conductances, and
   wherein the processing circuitry is configured to derive the output signal based on a weighted difference of the first and second temperature signals with weights such that a sensitivity of the output signal to pressure changes is reduced or eliminated.

18. The thermal sensor device of claim 17, wherein the heater bridge is arranged between the first and second measurement bridges.

* * * * *